J. F. MONNOT.
PROCESS OF PRODUCING COATED METAL OBJECTS.
APPLICATION FILED SEPT. 6, 1907. RENEWED JUNE 16, 1909.
929,777.
Patented Aug. 3, 1909.
2 SHEETS—SHEET 1.
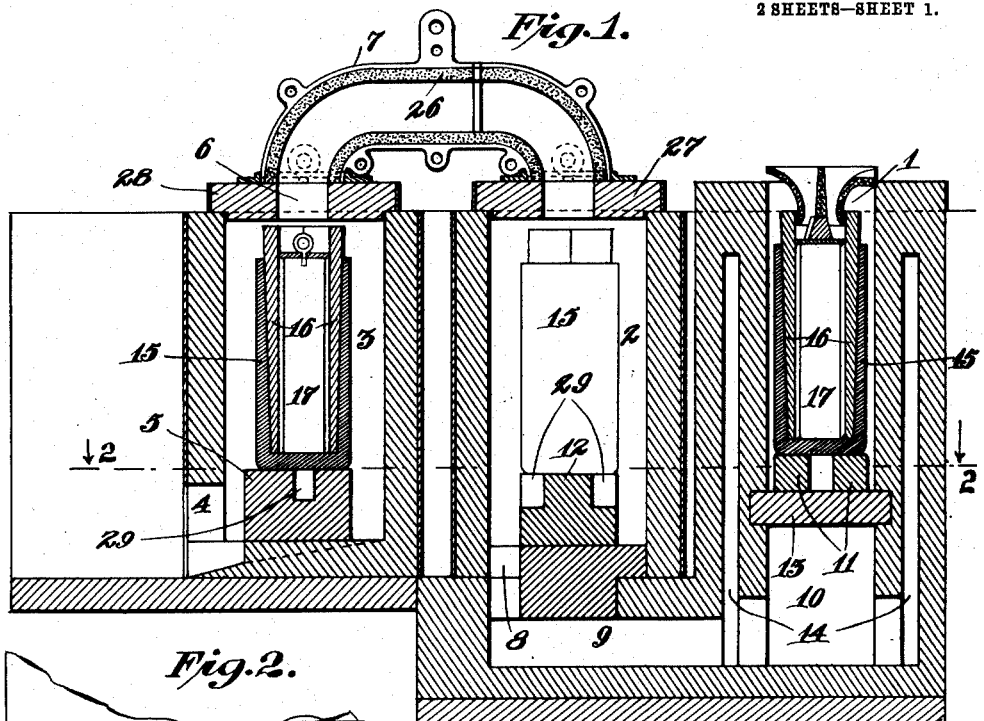
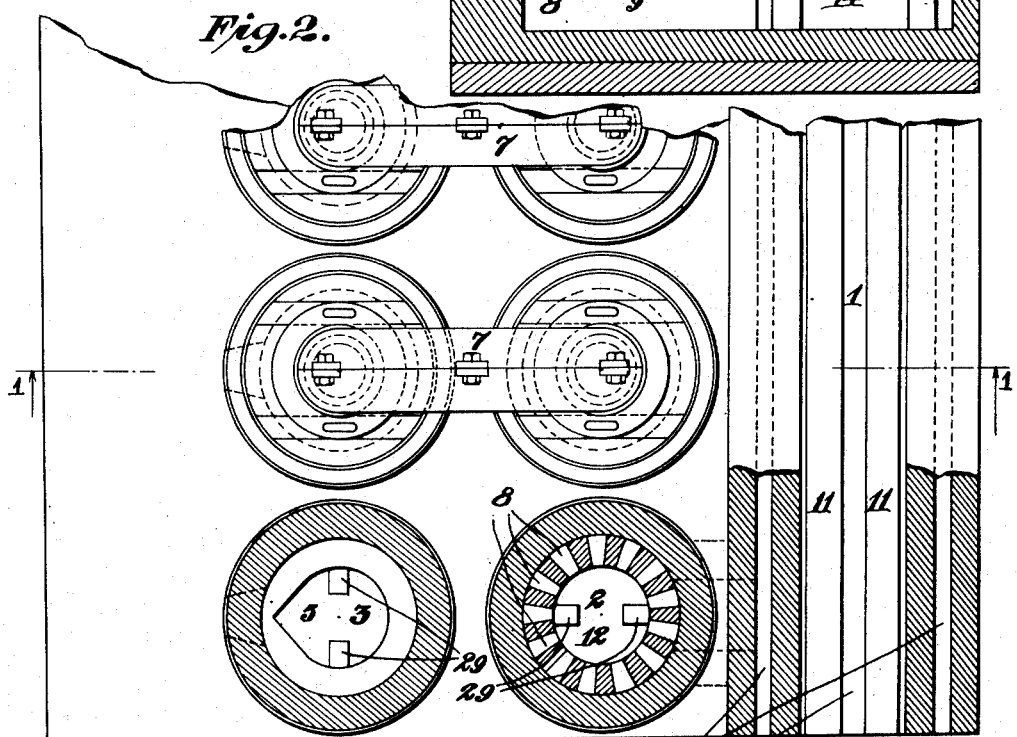
Attest:
Inventor:
John Ferréol Monnot
by Marble, McElroy & Motty Attys.

J. F. MONNOT.
PROCESS OF PRODUCING COATED METAL OBJECTS.
APPLICATION FILED SEPT. 6, 1907. RENEWED JUNE 16, 1909.
929,777.
Patented Aug. 3, 1909.
2 SHEETS—SHEET 2.
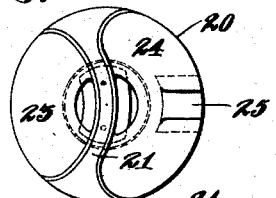
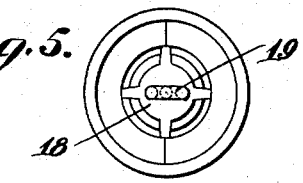
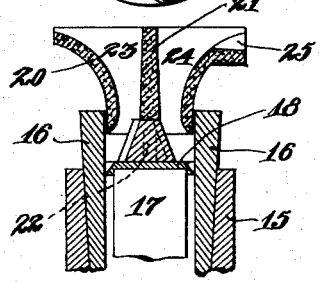
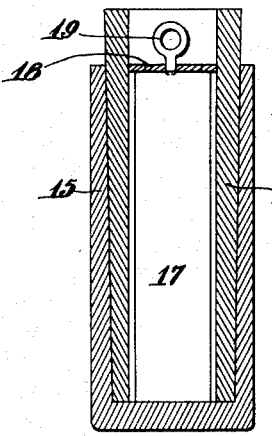
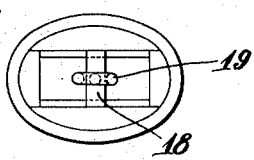
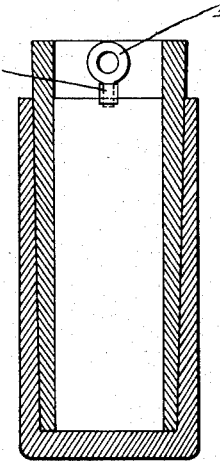
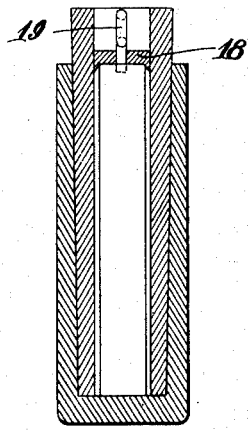
Attest:
Inventor: John Ferreol Monnot
by Marble, McElroy & Matty Attys.

UNITED STATES PATENT OFFICE.

JOHN FERREOL MONNOT, OF NEW YORK, N. Y., ASSIGNOR TO DUPLEX METALS COMPANY, OF NEW YORK, N. Y., A CORPORATION OF NEW YORK.

PROCESS OF PRODUCING COATED METAL OBJECTS.

No. 929,777.  Specification of Letters Patent.  Patented Aug. 3, 1909.

Application filed September 6, 1907, Serial No. 391,673. Renewed June 16, 1909. Serial No. 502,443.

*To all whom it may concern:*

Be it known that I, JOHN FERREOL MONNOT, a citizen of the United States, and a resident of the city, county, and State of New York, have invented certain new and useful Improvements in Processes of Producing Coated Metal Objects; and I hereby declare the following to be a full and exact description thereof, such as will enable others skilled in the art to which the invention pertains to make and practice the same.

My invention relates to a process of producing ingots and like bodies of coated metals, and more particularly to a process of producing clad metals, by which term is meant bodies comprising a core or base of one metal (iron or steel for instance), having united thereto, and preferably inseparably united or welded thereto, a substantial coating or layer of an unlike metal, (for instance, copper, silver, gold, aluminum, brass, bronze, aluminum bronze, etc.)

In Patents Nos. 851,684, 851,993, and 853,716, and in various pending applications, I have illustrated and described apparatus and processes for producing clad metal bodies such as referred to, and comprising various pairs of unlike metals such as referred to inseparably welded together; the pairs of metals being in some cases united by an intermediate thin layer of a third metal inseparably welded to both. According to the present process, and by the apparatus herein illustrated and described, I produce such coated or clad metal objects by casting the molten coating metal around or against a metal core or base in the solid state located in a suitable mold and submerged in a liquid wiping material such as hereinafter referred to, and causing such molten metal to displace the wiping material and so to come into direct wetting contact with the surface of said solid metal object, and to solidify thereagainst. I thereby maintain a clean surface of the object to be coated up to the time of such contact with the molten coating metal, and free the coating metal from occluded gases and oxid impurities. I also avoid progressive contamination of the molten metal so cast, such metal being transferred direct from its melting furnace to the mold without intermediate contact with metals which it may dissolve or absorb. The process particularly lends itself to the coating of objects on less than all their sides, and to the production of flat-sided ingots, slabs etc.

According to the present process, the molten metal is caused to pass through a layer of wiping liquid, as it is cast, and thereby all entrained gases, superficial oxid, etc. are removed from such cast metal; and it is caused to solidify in a condition of exceptional purity and freedom from bubbles, blow-holes, and occluded gases, as a dense, tough and fine-grained metal. The base or object to be coated is also, preferably, immersed in this "wiping liquid" and is thereby protected from oxidation or contamination; said liquid being displaced from around said base by the molten metal as it rises in the mold, so that intimate contact occurs between an absolutely clean surface of said base and absolutely clean molten coating metal, entirely without intermediate contact of air or other contaminating or chemically active media.

The core or base to be coated is commonly heated to a high temperature before the molten metal is caused to contact with its surface; and preferably this heating is conducted by placing the said core or base in the mold in which the casting is to be done, said mold containing a sufficient quantity of said wiping material (either solid or molten) to completely submerge said base, and then the mold is placed in a suitable heating furnace (if not already in such furnace) and heated therein to the desired temperature; the enveloping body of wiping material (which, if not already molten, melts in the furnace) preventing contact of air or furnace gases with the surface of said core or base and so preventing contamination thereof. This wiping material may be entirely neutral as regards the metal of the core or base or oxids and other coatings formed thereon by the action of contaminating agents, or it may have more or less cleansing or solvent power. Sodium silicate (water glass) is one suitable wiping material which may be used. This material, placed solid in the mold, soon melts under the action of the heat of the furnace, but seems to have comparatively little solvent power for oxid coatings on iron or steel; such solvent action not being required if the surface of the iron or steel base or core be carefully cleaned, as should be the case, before said core or base is placed in the mold. If greater solvent action as regards oxid or other contaminating coating is desired, borax may be added in greater or less quantity to the sodium silicate.

The apparatus which I prefer to use in carrying out my process comprises a furnace having a plurality of heating chambers through which furnace gases circulate successively, said chambers adapted to receive the molds in which the casting is to be done. Such molds may be similar, in material and construction, to graphite and other refractory crucibles, and may be provided with removable sectional liners; the surfaces of which against which the molten metal solidifies being easily kept true and smooth and the distance of which from the surface of the core or base being easily regulated. The crucibles are commonly placed, in the first instance, in a preliminary heating chamber of the furnace, wherein the wiping material, if introduced solid into the crucible, is caused to melt; the cores or bases to be coated being introduced into their molds or crucibles while the latter are in this preliminary heating chamber, and being heated in such chamber to a certain extent. After a time, the molds or crucibles are removed from such preliminary heating chamber to an intermediate heating chamber; and after heating in such chamber for a time said molds or crucibles are removed to a final heating chamber, wherein the contents of said molds are raised to the desired temperatures. Said molds or crucibles are then returned to the preliminary heating chamber, and while there the molten metal is poured into them, and is allowed to solidify; the temperature of such preliminary heating chamber being maintained much below the solidification temperature of the molten coating metal. When the molten metal has solidified, the coated cores or bases, which may now be termed clad-metal ingots, are removed from their molds and worked in any suitable manner, either immediately or after submission to a soaking heating, with or without intermediate cooling.

By the process above outlined clad-metal ingots may be produced wherein the coating is so inseparably united to the base or core as to be inseparable therefrom by the action of heat or cold or by anything short of cutting or grinding it off or the action of solvents; it being impossible to split the coating off by attempting to cause a cold chisel to follow the line of union, the tool to the contrary tending to diverge into the one metal or the other and refusing to follow the line of union. The union produced appears to be equivalent to a weld between two bodies of iron or steel, for example, and I believe it to be a true weld.

In the accompanying drawings I illustrate one form of apparatus embodying my invention and adapted for carrying out the process above described.

In said drawings, Figure 1 shows a vertical section through a group of heating chambers such as above referred to. Fig. 2 shows a top view of a plurality of groups of such heating chambers and a horizontal section through one such group. Fig. 3 is a top view of a pouring tile such as is commonly fitted to the molds when pouring the same, and Fig. 4 shows a vertical section of such tile and of the upper portion of a mold to which said tile is fitted. Fig. 5 shows a top view, and Fig. 6 a central vertical section, of a mold fitted for coating round cores or bases; a core or base being shown in place in the mold. Fig. 7 shows a top view, Fig. 8 a vertical section, and Fig. 9 another vertical section on a plane at right angles to that of Fig. 8, of a mold fitted for coating rectangular cores or bases; such a core or base being shown in place in the mold.

Referring now to the drawings, and at first more particularly to Figs. 1 and 2, 1 designates a preliminary heating chamber or pouring pit; 2 an intermediate heating chamber, and 3 a final heating chamber. Chamber 3 is provided with an opening 4 through which a flame jet may be projected from a suitable burner, not shown, the flame being caused to impinge against a suitable pedestal or spreader 5 and then to rise up through the chamber, finally passing therefrom through a port 6 and duct 7 into chamber 2, and thence through openings 8 in the bottom thereof and a duct 9 into flue 10 at the bottom of chamber 1 and thence to a suitable offtake, not shown. Chambers 1 and 2 have pedestals, 11 and 12 respectively, to support the crucibles or molds, pedestal 11 being composed of two longitudinal members resting on a slab 13 separating furnace chamber 1 from flue 10. Chamber 1 is jacketed with products of combustion, there being on both sides of it spaces 14 connected to off-take flue 10.

Numerals 15 designate the molds, which usually are similar in form and material to crucibles such as are adapted for withstanding high temperatures. Within these crucibles are liners 16 (Figs. 3-9 inclusive) comprising wedges or liner-sections of refractory material (usually substantially the same material as the crucibles) the outer sides of which correspond substantially in taper to the usual taper of the walls of the crucibles, and the inner sides of which have such shape as is desired for the completed ingot, being usually parallel, as ingots with parallel sides are usually desired.

17, 17 designate the cores or bases to be coated, within the crucibles. Preparatory to introducing them into the molds, the cores or bases are usually cleaned thoroughly, as by sand-blasting, pickling, etc., so as to remove all surface scale, oxid, etc., and to make their surfaces even, so that the coating formed may be of uniform depth throughout. Said bases are usually introduced into the molds while the latter are in the chamber 1, and when introduced are centered accurately with respect to the surfaces of the crucible-liner; which is usually done by introducing a suitable number of spacing-pieces into the mold before the core is introduced, then introducing the core, and then removing the spacing pieces; said spacing pieces being of a thickness corresponding to the intended distance between the sides of the core and the sides of the crucible-liner. To hold the core stationary and truly central at the top, it is usually provided with a spacing piece 18 of refractory material, held in place by the ring-bolt 19 by which the core is handled. Before the cores are introduced into the molds, the latter contain a suitable amount of molten wiping material, such as above referred to; and as the core is introduced into its mold this wiping material rises around it and completely covers it, so protecting it against oxidation or attack by furnace gases.

The crucible with a core therein remains in chamber 1 until its contents have been heated therein sufficiently and until there is a vacancy in one of the chambers 2, and is then lifted out of chamber 1 and deposited in chamber 2. After being heated sufficiently therein, and when there is a vacancy in one of the chambers 3 the crucible is lifted out of chamber 2 and deposited in chamber 3. When the contents of the crucible have been sufficiently heated in chamber 3 (which is told by a peculiar surface appearance which the workman soon learns to recognize), the crucible with its contents is removed from chamber 3 and restored to chamber 1, and the molten coating metal, previously melted in another furnace not shown, but which may be of ordinary construction, is poured into the crucible or mold, displacing the wiping material from contact with the core and so coming into complete wetting contact with a clean surface of said core. To facilitate the flow of the molten coating metal into the mold without erosion of the soft highly heated top of the core and ring-bolt 19, and to take care of the displaced wiping material, I commonly fit to the mold, just before the pouring, a pouring-tile 20 of suitable refractory material, said pouring-tile having a central partition 21 adapted to rest upon the spacing piece 18 (said partition 21 having a cavity 22 to receive the said ring-bolt 19) and having passages 23 and 24, of which 23 is intended to receive the stream of molten metal and direct it over the edge of spacing piece 18 to the annular space between the core and the sides of the mold, and 24 is intended to receive the displaced molten wiping material. Passage 24 is preferably large enough to contain the entire mass of displaced wiping material, without overflow; but to take care of overflow, if it occurs, a lip 25 is provided which will discharge any overflow beyond the edge of the mold.

The mold having been poured in the manner stated, the molten metal is allowed to solidify, after which the pouring-tile (the wiping material in which has also solidified) is removed, the completed ingot removed from the mold, the liner coming out with it, and then the sections of said liner are removed from the ingot and after they have cooled sufficiently are dressed to size and resurfaced if necessary, and are then placed back in the same or another similar mold, which may then be placed in the furnace chamber 1, with a suitable quantity of wiping material therein, and the operation repeated. The wiping material which solidifies in the pouring tile may be removed therefrom, broken up, and used over again a number of times.

It is desirable that certain metals, copper for example, shall be cooled as soon as possible after casting; and it is also necessary in certain cases to guard against more rapid cooling at the ends than near the center of the ingot, which may cause the cast metal to be drawn out somewhat at the center, producing an ingot of irregular size, which is difficult to roll properly. To cause rapid cooling I direct a stream of cold air against the sides and bottom of the crucible as soon as the latter has been withdrawn from furnace chamber 1, regulating the application of this blast of air so as to cause substantially uniform cooling throughout the length of the ingot; and as soon as the cast metal has set and the ingot has been removed from the mold and the liner sections stripped therefrom the ingot may be cooled. The ingot is then, at any suitable time, reheated, and worked under the hammer, between rolls, or in a press, to compact the metal and to reduce the ingot to desired forms. In general, the coatings formed as above described are very dense, uniform, and free from pits, blow-holes, blebs, porosity, etc., and the metal is very soft, tough and ductile.

In forming weld-unions between the core or article to be coated, and the cast-on coating, as is usually desired, I commonly heat the said core, immersed as described in the molten wiping material, to or nearly to an orange heat; if the core be of iron or steel, a low welding heat such as is well known to blacksmiths being suitable, and it being easy to tell, by the surface appearance of the molten wiping material in the mold, when this heat is reached. Likewise, when such weld-unoins are desired, the molten coating metal is commonly heated to a temperature much above the melting point and ordinary casting temperature and approaching or equaling the "supermolten temperature" (2400° to 2800° F. in the case of copper and silver and somewhat lower in the case of aluminum) referred to in my Patent No. 853,716 above mentioned. It is probable that for the formation of such a weld-union between unlike metals absolute wetting of the solid metal by the molten metal is required, and that such wetting does not take place, uniformly or sufficiently, unless the molten metal contacting with the surface of the solid metal be at a temperature considerably above the ordinary casting temperature; likewise it is possible that at such high or "supermolten" temperature the molten metal acquires the power of uniting with the solid metal by an action analogous to, or which actually is, a chemical action.

The process and apparatus above described lend themselves well to the production of ingots of various cross-sections and to the production of ingots coated on certain sides only, and have the important advantage that molds or crucibles need be only a little larger than the ingots to be produced; which at once permits the coating of larger cores, and the use of smaller and less expensive crucibles, as compared with the process and apparatus of my said Patent No. 853,716.

In Figs. 5, 6 and 7, I have shown a mold adapted for forming rectangular ingots coated on their broader sides only; the narrow sides, or edges, of the core fitting closely against the mold-liner, so that such sides are not coated. While the ingot to be produced is rectangular, the crucible itself is preferably oval, to avoid the well-known weakness at the corners to which rectangular crucibles are liable.

In Figs. 8 and 9 I have shown a mold adapted for forming cylindrical ingots.

It will be obvious that by the use of suitably-formed molds, liner-sections, and cores, ingots of various other forms may be produced.

The conduction of the heating gases from chamber 3 to chamber 2 and thence beneath and around chamber 1 greatly economizes the consumption of fuel, chambers 1 and 2 being in effect heated by waste gases; and the gradual heating to which the crucibles are subjected greatly increases their life. The conduit 7, conveying the heating gases from chamber 3 to chamber 2, comprises a metal shell lined with refractory material, 26; and said conduit is removable, as shown, together with or separately from the covers 27 and 28 of chambers 2 and 3, to permit insertion and withdrawal of the crucibles. To permit the introduction of the prongs of crucible-tongs beneath the crucibles, pedestals 5 and 12 are provided with recesses 29; and the space between the longitudinal supports 11 of chamber 1 serves the same purpose.

In many cases it is desired that the coating formed as above described shall be exceptionally pure. In the production of ingots for copper-clad steel electric conductors, for example, it is desirable that the copper shall not be contaminated with iron or other impurities during the process. I have found that highly heated copper is exceedingly subject to contamination by furnace gases, air etc., as well as by prolonged contact, or successive contacts, while in this highly heated condition, to iron or steel. By the method above described, the copper is preserved from contamination, being poured directly from the melting furnace through the wiping material mentioned into the mold and there solidifying against the object to be coated.

In another application for Letters Patent, executed concurrently with this, (Ser. No. 391,674, filed Sept. 6, 1907) I have set forth at length the advantages of casting through a layer of wiping material, when forming metal ingots; one advantage being that the stream of molten metal, in passing through the wiping material, is freed of entrained gases, oxid and other impurities, so that the molten metal appears at the base of the body of wiping material in a chemically clean form, so far as the presence of air or moisture is concerned, and the several particles or drops have a clean metallic surface, enabling them to unite with each other to form a homogeneous flawless body of metal, and enabling them to unite with the clean surface of the core to form a permanent union therewith. And since there is no film of "absorbed" air or moisture on the surface of the mold, and since air and gases are not entrained by the molten metal or occluded therein, the surface of the ingot cast as above described is practically free from blow-holes, blebs and other flaws. Since in my said companion application I claim broadly the casting of molten metal through a layer of molten wiping material, I do not claim the same herein.

Instead of employing sodium silicate as the wiping material, I may employ other alkaline silicates, or fusible material containing alkaline silicate, glass for example, or I may employ borax or other fusible non-metallic inorganic material. In general I prefer that the material used shall have no particular solvent or chemical effect on the article to be coated, and hence do not ordinarily employ borax unless neutralized partly or wholly by soda; though sometimes borax is added to the wiping material to dissolve off traces of superficial oxid which the article to be coated may have.

In some cases, when coating a metal of high melting point, steel for example, with a metal of low melting or volatilizing point, or with an alloy containing an ingredient of low volatilizing point (brass or bronze for example) I may film-coat the article to be coated with a metal capable of being heated to a high or to a supermolten temperature, by dipping said object in a bath of such metal maintained at such high or supermolten temperature, and may then place the film-coated object in a mold and cast the metal for the main coating against it, according to the process above described; the metal for the intermediate or film coating being in such case a metal which unites inseparably with the object to be coated under the conditions stated, and which unites readily and inseparably with the metal for the main coating at a lower temperature; or, I may form on the object to be coated a thin coating of such intermediate metal by the casting process above described, and then form an additional coating of the main coating metal by the casting process above described.

The core or base need not be iron or steel, but for most purposes an iron or steel base will be preferred. In this specification and in the following claims I employ the term "iron" to designate all forms of iron and steel, including the various compound steels, such a tungsten steel, titanium steel, vanadium steel, chrome steel, nickel steel, cobalt steel, manganese steel, etc.

While I particularly contemplate employing my process in the production of compound metal ingots, comprising two or more unlike metals inseparably united or welded, the process and the apparatus above described are applicable to the production of ingots comprising layers of the same metal or different grades of the same metal, or of a metal and an alloy thereof.

What I claim is:

1. The process of producing coated metal objects, which consists in submerging a metal article to be coated in a body of molten inorganic wiping material contained within a suitable mold, and pouring molten coating metal into said mold and causing such molten metal to displace said molten wiping material and to contact with the object to be coated, and then permitting such molten cast metal to solidify.

2. The process of producing coated metal objects, which consists in heating a metal article to be coated in a suitable mold while submerged in a body of molten inorganic wiping material, and pouring molten coating metal into said mold and causing such molten metal to displace said molten wiping material and to contact with the object to be coated, and then permitting such molten cast metal to solidify.

3. The process of producing coated metal objects comprising unlike metals united together, which consists in pouring a molten body of one such metal into a suitable mold containing a solid body of the other metal submerged in molten inorganic wiping material and causing such molten cast metal to displace said molten wiping material and to contact with the object to be coated, and then permitting such molten cast metal to solidify.

4. The process of producing coated metal objects comprising unlike metals united together, which consists in pouring a molten body of one such metal into a suitable mold containing a highly heated solid body of the other metal submerged in inorganic wiping material and causing such molten cast metal to displace such molten wiping material and to contact with the object to be coated, and then permitting such molten cast metal to solidify.

5. The process of producing objects comprising unlike metals inseparably united, which consists in pouring a molten body of one such metal, heated to a temperature much above its melting point, into a suitable mold containing a highly heated solid body of the other metal submerged in molten inorganic wiping material and causing such molten cast metal to displace such molten wiping material and to contact with the said body of the other metal and to solidify thereagainst.

6. The process of producing objects comprising unlike metals inseparably united, which consists in pouring a molten body of one such metal into a suitable mold containing a solid body of the other metal submerged in molten inorganic wiping material and heated to a welding heat, and causing such molten cast metal to displace such molten wiping material and to contact with the said body of the other metal and to solidify thereon.

7. The process of producing objects comprising unlike metals inseparably united, which consists in pouring a supermolten body of one such metal into a suitable mold containing a solid body of the other metal submerged in molten inorganic wiping material and heated to a welding heat, and causing such molten cast metal to displace such molten wiping material and to contact with the said body of the other metal and to solidify thereon.

8. The process of producing objects comprising ferrous and non-ferrous metals inseparably united, which consists in pouring molten non-ferrous metal into a suitable mold containing a solid body of ferrous metal submerged in molten inorganic wiping material, and causing such molten cast metal to displace such molten wiping material and to contact with the said body of ferrous metal and to solidify thereon.

9. The process of producing objects comprising ferrous and cupriferous metals inseparably united, which consists in pouring molten cupriferous metal into a suitable mold containing a solid body of ferrous metal submerged in a molten inorganic wiping material, and causing such molten cast metal to displace such molten wiping material and to contact with said body of ferrous metal and to solidify thereon.

10. The process of producing objects comprising iron and copper inseparably united, which consists in pouring supermolten copper into a suitable mold containing a body of solid iron heated to welding heat, and submerged in a molten inorganic wiping material, and causing such molten cast metal to displace such molten wiping material and to contact with the iron and solidify thereon.

11. The process of producing objects comprising unlike metals inseparably united, which consists in placing a clean body of one metal, in a solid state, into a mold containing sufficient inorganic wiping material to cover said metal body, heating the mold and its contents and thereby raising said metal body to a welding heat, and pouring highly heated unlike metal into said mold and causing such molten cast metal to displace such molten wiping material and to contact with the solid metal and solidify thereagainst.

12. The process of producing coated metal objects which consists in submerging a metal object to be coated in a body of an alkaline silicate in a mold, pouring molten coating metal through such body into contact with said object and thereby displacing the body, and then permitting the molten coating metal to solidify in contact with said object.

13. The process of producing coated metal objects which consists in submerging a ferrous metal object in a body of an alkaline silicate in a mold, pouring molten non-ferrous coating metal through such body into contact with said object and thereby displacing said body, and then permitting the molten non-ferrous coating metal to solidify in contact with said ferrous metal object.

14. The process of producing coated metal objects which consists in submerging a ferrous metal object in a body of an alkaline silicate in a mold, pouring molten copper through such body into contact with said object and thereby displacing such body, and then permitting the copper to solidify in contact with said ferrous metal object.

In testimony whereof I affix my signature, in the presence of two witnesses.

JOHN FERREOL MONNOT.

Witnesses:
H. M. MARBLE,
K. P. McELROY.